United States Patent
Venkat et al.

(10) Patent No.: US 10,740,019 B1
(45) Date of Patent: Aug. 11, 2020

(54) DATA MIGRATION USING WRITE PROTECTION

(71) Applicant: EMC IP Holding Company LLC, Hopkinton, MA (US)

(72) Inventors: Prakash Venkat, Bangalore (IN); Gopakumar Ambat, Bangalore (IN); Amihay Azruel, Raanana (IL); Mrutyunjaya Prasad Jali, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/263,400

(22) Filed: Jan. 31, 2019

(51) Int. Cl.
*G06F 13/00* (2006.01)
*G06F 3/06* (2006.01)
*G06F 11/14* (2006.01)

(52) U.S. Cl.
CPC .......... *G06F 3/0647* (2013.01); *G06F 3/0607* (2013.01); *G06F 3/0622* (2013.01); *G06F 3/0632* (2013.01); *G06F 3/0634* (2013.01); *G06F 3/0685* (2013.01); *G06F 11/1438* (2013.01)

(58) Field of Classification Search
CPC .... G06F 3/0647; G06F 3/0607; G06F 3/0634; G06F 3/0632; G06F 3/0685; G06F 3/0622; G06F 11/1438
See application file for complete search history.

(56) References Cited

U.S. PATENT DOCUMENTS

| | | | |
|---|---|---|---|
| 7,107,421 B2 * | 9/2006 | Kaneda | G06F 3/0622 711/162 |
| 7,278,000 B2 * | 10/2007 | Nonaka | G06F 3/0607 711/112 |
| 8,706,960 B1 * | 4/2014 | Ives | G06F 3/0617 711/114 |
| 9,122,689 B1 | 9/2015 | Bono et al. | |
| 9,229,656 B1 | 1/2016 | Contreras et al. | |
| 9,830,105 B1 | 11/2017 | Tummala et al. | |
| 9,933,957 B1 | 4/2018 | Cohen et al. | |
| 10,007,626 B1 | 6/2018 | Saad et al. | |
| 10,037,157 B1 | 7/2018 | Koli et al. | |

(Continued)

OTHER PUBLICATIONS

Alan L. Taylor, et al.; "Managing Data Storage Migration for Virtual Machines," U.S. Appl. No. 14/754,961, filed Jun. 30, 2015.

(Continued)

*Primary Examiner* — Jing-Yih Shyu
(74) *Attorney, Agent, or Firm* — BrainwoodHuang (57) ABSTRACT

Techniques are presented for implementing non-host-based migration in a manner that is not subject to certain types of data corruption. This may be accomplished by preventing any hosts from having write access to a target LUN until it can be confirmed that all applications that access a source LUN have been shut down. This arrangement prevents accidentally writing to the target LUN while the source LUN is still being accessed. As a further precaution, just in case the confirmations are incorrect, a target data storage system can direct a source data storage system to remove access to the source LUN from all of the hosts, which has a similar effect. The migration can then proceed.

20 Claims, 3 Drawing Sheets

(56) References Cited

U.S. PATENT DOCUMENTS 10,180,790 B1   1/2019   Taylor et al.

OTHER PUBLICATIONS

Zexian Liao, et al.; "Data Storage System With Transparent Presentation of File Attributes During File System Migration," U.S. Appl. No. 15/582,712, filed Apr. 30, 2017.
Zexian Liao, et al.; "Data Storage System With On-Demand Recovery of File Import Metadata During File System Migration," U.S. Appl. No. 15/582,713, filed Apr. 30, 2017.
Ivan Bassov; "Tool for Selectively Deploying Inline Compression," U.S. Appl. No. 15/966,584, filed Apr. 30, 2018.
Changyu Feng, et al.; "Method and Device of Managing Storage System," U.S. Appl. No. 16/191,926, filed Nov. 15, 2018.
Dmitry Tylik, et al.; "Non-Disruptive Migration of a Virtual Volume in a Clustered Data Storage System," U.S. Appl. No. 16/176,782, filed Oct. 31, 2018.
Dmitry Tylik, et al.; "Supporting Non-Disruptive Movement of a Logical Volume of Non-Volatile Data Storage Between Storage Appliances," U.S. Appl. No. 16/176,819, filed Oct. 31, 2018.
Hewlett Packard Enterprise Development LP, "HPE 3PAR Peer Motion and HPE 3PAR Online Import User Guide," Sep. 2018, 417 pages, retrieved from <https://support.hpe.com/hpsc/doc/public/display?docId=c04783896>.

\* cited by examiner

Fig. 1

DATA MIGRATION USING WRITE PROTECTION

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices In many cases, it is desired to transfer the contents of a source LUN hosted by a first data storage system to a target LUN to be created on a second data storage system. Data transfer from the first data storage system to the second data storage system may be conducted using data migration. During migration, a bulk copy is made of data of the source LUN to the target LUN. While the bulk copy is occurring, I/O requests for read and write operations are sent to the source LUN, the target LUN, or both, depending on the state of migration and on whether the I/O requests are reads or writes. At the conclusion of data migration, the entire contents of the source LUN have been copied to the target LUN, and subsequent I/O requests may be directed exclusively to the target LUN. The source LUN may be taken off line and retired.

In one conventional system, an administrator operates the second data storage system, discovers the first data storage system, and selects the source LUN on the first data storage system to be migrated to the second data storage system. An application running on the second data storage system creates the target LUN, assigning it the same size as the source LUN, and makes the still-empty target LUN accessible to hosts. A user of an application running on a host that accesses the source LUN is asked to shut down the application, after which the user searches for new LUNs, which include the target LUN. The user may then reconfigure the application to use the target LUN in place of the source LUN, after which the user restarts the application. At this point, write I/Os from the application are directed to both the source LUN and the target LUN, while a bulk copy is performed in the background to transfer the contents of the source LUN to the target LUN.

SUMMARY

Unfortunately, the above-described conventional approach to migration of a LUN from one data storage system to another may suffer from limitations. For example, creating the target LUN generally involves applying a signature to the target LUN that matches a signature on the source LUN. Once the target LUN is made accessible to a host, a driver within the host's I/O stack (e.g., the Linux Logical Volume Manager) may mistake the two LUNs with the same signature as mirrors and begin mirroring data therebetween. Such mirroring can result in data corruption, particularly if it happens in parallel with migration, as multiple writers may be writing to the source LUN without knowledge of the activities of the other. Although it may be possible to avoid corruption by initiating the migration from a host-based migration manager, it is often undesirable to install a host-based migration manager; host-based migration is very expensive since it consumes host processing power for the migration. Host-based migration is also very slow, since the data path goes through the host.

As another example, if a cluster of hosts run applications that access the source LUN but the application on a particular host has failed to shut down prior to the migration beginning, the particular host may continue issuing I/Os exclusively to the source LUN as the migration proceeds. This scenario could also give rise to data corruption or data inconsistency.

In order to address these deficiencies, it would be desirable to implement non-host-based migration in a manner that is not subject to these types of data corruption. This may be accomplished by preventing any hosts from having write access to the target LUN until it can be confirmed that all applications that access the source LUN have been shut down. This arrangement prevents accidentally writing to the target LUN while the source LUN is still being accessed. As a further precaution, just in case the confirmations are incorrect, the target data storage system can direct the source data storage system to remove access to the source LUN from all of the hosts, which has a similar effect. The migration can then proceed.

In one embodiment, a method performed by a target data storage system (DSS) of migrating a source data object (DO) hosted on a remote DSS to a target DO hosted by the target DSS such that a set of applications running on a set of host devices that are initially configured to store application data on the source DO become reconfigured to store application data on the target DO is provided. The method includes (a) initially providing the target DO in a write-protected state, the write-protected state preventing the set of host devices from writing to the target DO; (b) after receiving confirmation that each application of the set of applications has been shut down, reconfiguring the target DO to operate in a write-permitted state, the write-permitted state permitting the set of host devices to write to the target DO; (c) after reconfiguring the target DO to operate in the write-permitted state, receiving confirmation that the set of applications have been restarted in a revised configuration to store application data on the target DO; and (d) after receiving confirmation that the set of applications have been restarted in the revised configuration, performing an online migration during which the source DO is copied to the target DO while the set of applications run on the set of host devices with continued access to the application data. Systems, apparatuses, and computer program products for performing similar methods are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for implementing non-host-based migration in a manner that is not subject to certain types of data corruption. This may be accomplished by preventing any hosts from having write access to a target LUN until it can be confirmed that all applications that access a source LUN have been shut down. This arrangement prevents accidentally writing to the target LUN while the source LUN is still being accessed. As a further precaution, just in case the confirmations are incorrect, a target data storage system can direct a source data storage system to remove access to the source LUN from all of the hosts, which has a similar effect. The migration can then proceed.

Figure 1:
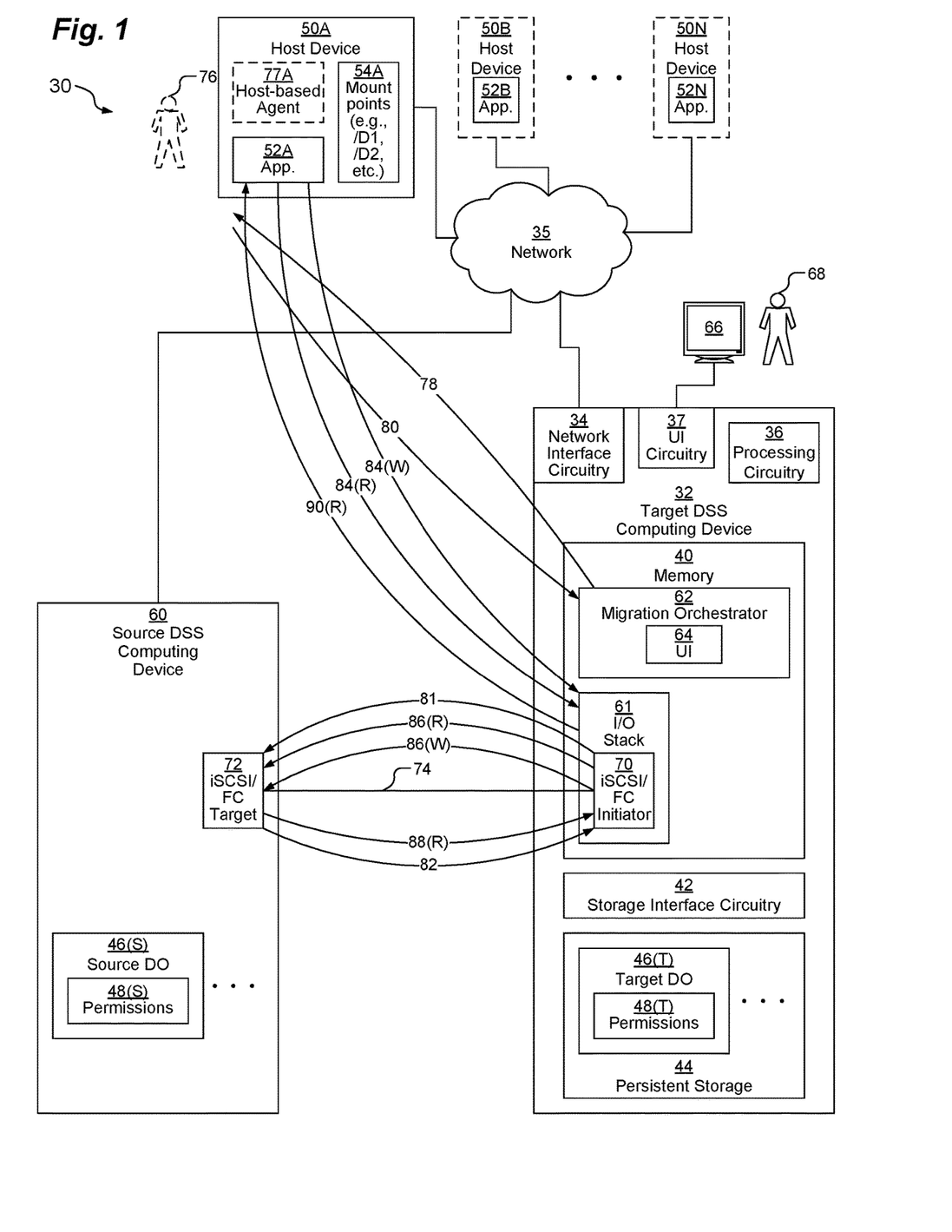
FIG. 1 is a block diagram depicting an example system and apparatus for use in connection with various embodiments.

FIG. 1 depicts an example environment 30 that includes a target data storage system (DSS) computing device 32. Target DSS computing device 32 communicatively connects to one or more host devices 50 configured to send input/output (I/O) requests to the target DSS computing device 32 for fulfillment over a network 35.

Target DSS computing device 32 may be any kind of computing device capable of servicing I/O requests, such as, for example, a personal computer, workstation, server computer, enterprise server, data storage system (DSS) rack server, laptop computer, tablet computer, smart phone, mobile computer, etc. In one example, target DSS computing device 32 is a DSS rack server, such as, for example, a VNX, VNXe, VMAX, Unity, or Trident data storage system produced by Dell/EMC of Hopkinton, Mass.

Target DSS computing device 32 includes network interface circuitry 34, processing circuitry 36, user interface (UI) circuitry 37, storage interface circuitry 42, persistent data storage 44, and memory 40. Target DSS computing device 32 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network 35. Network interface circuitry 34 allows the target DSS computing device 32 to communicate with one or more host devices 50 capable of sending data storage commands to the target DSS computing device 32 over the network 35 for fulfillment.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

In some embodiments, target DSS computing device 32 may be built as a set of two or more storage processors (SPs, not depicted) each mounted on a separate circuit board, each SP having its own network interface circuitry 34, processing circuitry 36, storage interface circuitry 42, and memory 40, but sharing the persistent storage 44 between them. In such embodiments, a high-speed inter-SP bus may connect the SPs. There may be more than one SP installed in target DSS computing device 32 for redundancy and performance reasons. In these embodiments, each SP may be considered independently for purposes of this disclosure.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, Small Computer Systems Interface (SCSI), Serial Attached SCSI (SAS), AT Attachment (ATA), Serial ATA (SATA), FC, M.2, and/or other similar controllers and ports. Persistent storage 44 includes one or more data objects (DOs) 46 (depicted as DOs 46(T), . . . ), each of which includes a set of permissions 48 (e.g., permissions 48(T) for DO 46(T)). A DO 46 is an instance of any kind of data structure that is used for storing data, such as, for example, a disk, a logical disk (also referred to as a "LUN"), a volume, a filesystem, etc.

One or more host devices 50 (depicted as host devices 50A, 50B, . . . , 50N) may reside on the network 35. Each host device 50 runs one or more applications 52 (depicted as applications 52A, 52B, . . . , 52N). Although each host 50 is depicted as running exactly one application 52, this is by way of example only. Thus, some host devices 50 may run more than one application 52, and there may be more applications 52 running within environment 30 than host devices 50. In some embodiments, multiple instances of the same application 52 runs on multiple host devices 50, which may function together as a host cluster.

Taking host device 50A as an example, application 52A is loaded within memory (not depicted) of host device 50A and executes on processing circuitry (not depicted) of host device 50A. As application 52A executes, it makes use of application data (not depicted) that it stores on a DO 46 hosted on a remote DSS. In an example, application 52A initially makes use of source DO 46(S) hosted by a source DSS computing device 60 for the application data. Source DSS computing device 60 may be similar to target DSS computing device 32, having its own network interface circuitry, processing circuitry, memory, storage interface circuitry, and persistent storage (all not depicted), each of which may have similar characteristics as network interface circuitry 34, processing circuitry 36, memory 40, storage interface circuitry 42, and persistent storage 44 of target DSS computing device 32, respectively. Thus, source DSS 60 also hosts a set of DOs 46, including source DO 46(S), within its persistent storage, and source DSS 60 is able to respond to I/O requests directed at source DO 46(S) from application 52A or other applications 52.

Host device 50A may include a set of mount points 54A, which may be used to allow various DOs 46 to be accessed via an operating system (not depicted) of host device 50A, as is known in the art. For example, the mount points 54A may include a mount point /D1 for source DO 46(S) on source DSS computing device 60 and another mount point /D2 for target DO 46(T) on target DSS computing device 32.

Memory 40 may be any kind of digital system memory, such as, for example, random access memory (RAM). Memory 40 stores various executing software applications and related data. Memory 40 includes an operating system (not depicted, e.g., a Linux, UNIX, Windows, MacOS, or similar operating system), an I/O stack 61, and a migration orchestrator 62 that run on processing circuitry 36. I/O stack 61 is a driver stack that is used to process I/O commands (e.g., read commands, write commands, etc.) received from the OS, local applications (not depicted), and remote applications 52 running on remote host devices 50. I/O stack 61 may include various drivers (not depicted, except for initiator 70) that are arranged in a stack configuration. The stack configuration allows for logical mapping at various levels. Thus, even though the top of I/O stack 61 is configured to receive I/O requests addressed to DOs 46, the bottom of I/O stack 61 may be configured to send low-level SCSI commands to particular physical addresses of physical disks of persistent storage 44, as is well-known in the art. It should be understood that source DSS computing device 60 may also operate an I/O stack that is similar to I/O stack 61. In some embodiments, source DSS computing device 60 and target DSS computing device 32 are DSSes of different types, each having different hardware and software configurations, and possibly produced and sold by different vendors using different technologies. Thus, the I/O stack of source DSS computing device 60 may be configured rather differently than I/O stack 61 of target DSS computing device 32, although at a high-level both serve a similar purpose.

Memory 40 also stores a migration orchestrator 62 program which is configured to orchestrate a migration from a source DO 46(S) on a remote source DSS computing device 60 to a target DO 46(T) on the target DSS computing device 32. In some embodiments, migration orchestrator 62 includes a UI 64 that is displayed to an administrator 68 via one or more UI devices 66 (e.g., a display screen or mouse, with additional UI devices 66 being used for receiving input, such as, for example, a mouse, keyboard, trackpad, touch-sensitive screen, etc.). UI 64 is used to allow the administrator 68 to configure and initiate the migration. For example, administrator 68 may search for local DSSes on the network 35, upon which the source DSS computing device 60 may be found. The administrator 68 may then select the source DSS computing device 60 and search for DOs 46 hosted by the source DSS computing device 60. The administrator 68 may then select source DO 46(S) for migration. The administrator 68 may also identify one or more applications 52 that make use of the selected source DO 46(S), as well as the host device 52 (or devices) on which the one or more applications 52 run. At that point, the administrator 68 may initiate the migration. Once the migration orchestrator 62 determines the size of the source DO 46(S), it may create, through the I/O stack 61, the target DO 46(T), making sure that the permissions 48(T) indicate that at least the host device(s) 50 identified as making use of the source DO 46(S) are not able to access the target DO 46(T) for writing. For example, in one embodiment, the migration orchestrator 62 may set the target DO 46(T) as read-only. In another embodiment, the migration orchestrator 62 may not even allow read access to the identified host devices 50 at all. In some embodiments, permissions 48(T) forbid write access (and possibly read access) to all host devices 50 on the network 35 as well as to all DSS computing devices 32, 60 on the network 35.

Once the migration orchestrator 62 creates the target DO 46(T), for every application 52 (e.g., application 52A) identified as making use of the source DO 46(S), migration orchestrator 62 sends a command 78 to either a user 76 with access to that application 52A or to a host-based agent 77A that is configured to control that application 52A, directing that the application 52A be shut down (and, in some embodiments, also directing that the source DO 46(S) be unmounted from host device 50A). Once the user 76 or host-based agent 77A shuts down the application 52A (and removes the mount point /D1), a confirmation signal 80 is returned to the migration orchestrator 62. Once the migration orchestrator 62 receives a confirmation signal 80 on behalf of every identified application 52 as being shut down (and on behalf of every host device 50 as having unmounted the source DO 46(S)), migration orchestrator 62 may reconfigure the permissions 48(T) of the target DO 46(T) to allow write access by the identified host devices 50. In some embodiments, migration orchestrator 62 may also send a command to source DSS computing device 60 instructing that the permissions 48(S) of the source DO 46(S) be reconfigured so that the identified host devices 50 no longer have access (neither read nor write access) to the source DO 46(S).

Then, migration orchestrator 62 may send a follow-up command (not depicted), directing either the user 76 or host-based agent 77A to restart the application 52A with a new configuration to make use of the target DO 46(T) for its application data rather than the source DO 46(S). Once it is confirmed that each identified application 52 that previously made use of the source DO 46(S) has been restarted in the new configuration to now make use of the target DO 46(T) for its application data rather than the source DO 46(S), migration orchestrator 62 may initiate a background copy operation from source DO 46(S) to target DO 46(T). This background copy may be initiated by an Internet SCSI (iSCSI) or FC initiator 70 (referred to hereinafter as "iSCSI/FC initiator") within the I/O stack 61 sending a copy command 81 across a data channel (e.g., an iSCSI or FC channel 74, referred to hereinafter as "iSCSI/FC channel") that was previously set up between the iSCSI/FC initiator 70 and a remote iSCSI or FC target 72 (referred to hereinafter as "iSCSI/FC target") operating on the source DSS computing device 60. Then, copy operations 82 begin to flow from the source DSS computing device 60 to the target DSS computing device 32 to fulfill the background copy.

In addition, once an application 52A is restarted in the new configuration, it is able to send I/O commands 84 (including read commands 84(R) and write commands 84(W)) to I/O stack 61 in order to read and write application data to/from the target DO 46(T). A read command 84(R) is processed by having the iSCSI/FC initiator 70 forward it as an iSCSI or FC read command 86(R) over the iSCSI/FC channel 74 to the iSCSI/FC target 72, which causes the appropriate data to be read from the source DO 46(S) and returned over the iSCSI/FC channel 74 as part of an iSCSI or FC read response 88(R) back to the iSCSI/FC initiator 70. The read data is then passed up the I/O stack 61 so that a read response 90(R) can be returned to the application 52A.

A write command 84(W) is processed in two ways in parallel (or concurrently). I/O stack 61 issues the write to the appropriate address of the target DO 46(T) on local persistent storage 44. In addition, the iSCSI/FC initiator 70 forwards the write as an iSCSI or FC write command 86(W) over the iSCSI/FC channel 74 to the iSCSI/FC target 72, which causes the data to be written to the appropriate address of the source DO 46(S). A write confirmation (not depicted) may be returned to the iSCSI/FC initiator 70 and then back to the application 52A.

These read and write commands 84(R), 84(W) may be sent and processed in parallel or concurrently with the background copy. As is known in the art, precautions are taken to ensure that the commands 84 and the background copy do not conflict.

Once the background copy finishes, processing of read and write commands 84(R), 84(W) in the above-described manner may continue until the administrator 68 instructs the migration orchestrator to either commit or revert the migration. If the migration is committed, the source DO 46(S) may either remain without being updated, or it may be deleted. If the migration is reverted, the permissions 48(S) are updated, the applications 52 are taken offline once again and reconfigured to revert to the original state using the source DO 46(S), after which they are restarted; the target DO 46(T) may also be deleted.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the Target DSS computing device 32 is powered off. Code for the OS, applications, I/O stack 61, iSCSI/FC initiator 70, migration orchestrator 62, and UI 64 are typically stored in this persistent storage portion of memory 40 or on persistent storage 44 so that they may be loaded into a system portion of memory 40 from this persistent storage portion of memory 40 or persistent storage 44 upon a system restart or as needed. The I/O stack 61, iSCSI/FC initiator 70, migration orchestrator 62, and UI 64, when stored in non-transient form either in the volatile portion of memory 40 or on persistent storage 44 or in persistent portion of memory 40, each form a respective computer program product. The processing circuitry 36 running one or more of I/O stack 61, iSCSI/FC initiator 70, migration orchestrator 62, and UI 64 thus forms a specialized circuit constructed and arranged to carry out the various processes described herein.

It should be understood that iSCSI/FC target 72, applications 52, and host-based agents 77 may also each be stored in persistent storage of their respective devices so that they may be restarted, and they also form respective computer program products and specialized circuits constructed and arranged to carry out the various processes described herein.

Figure 2A:
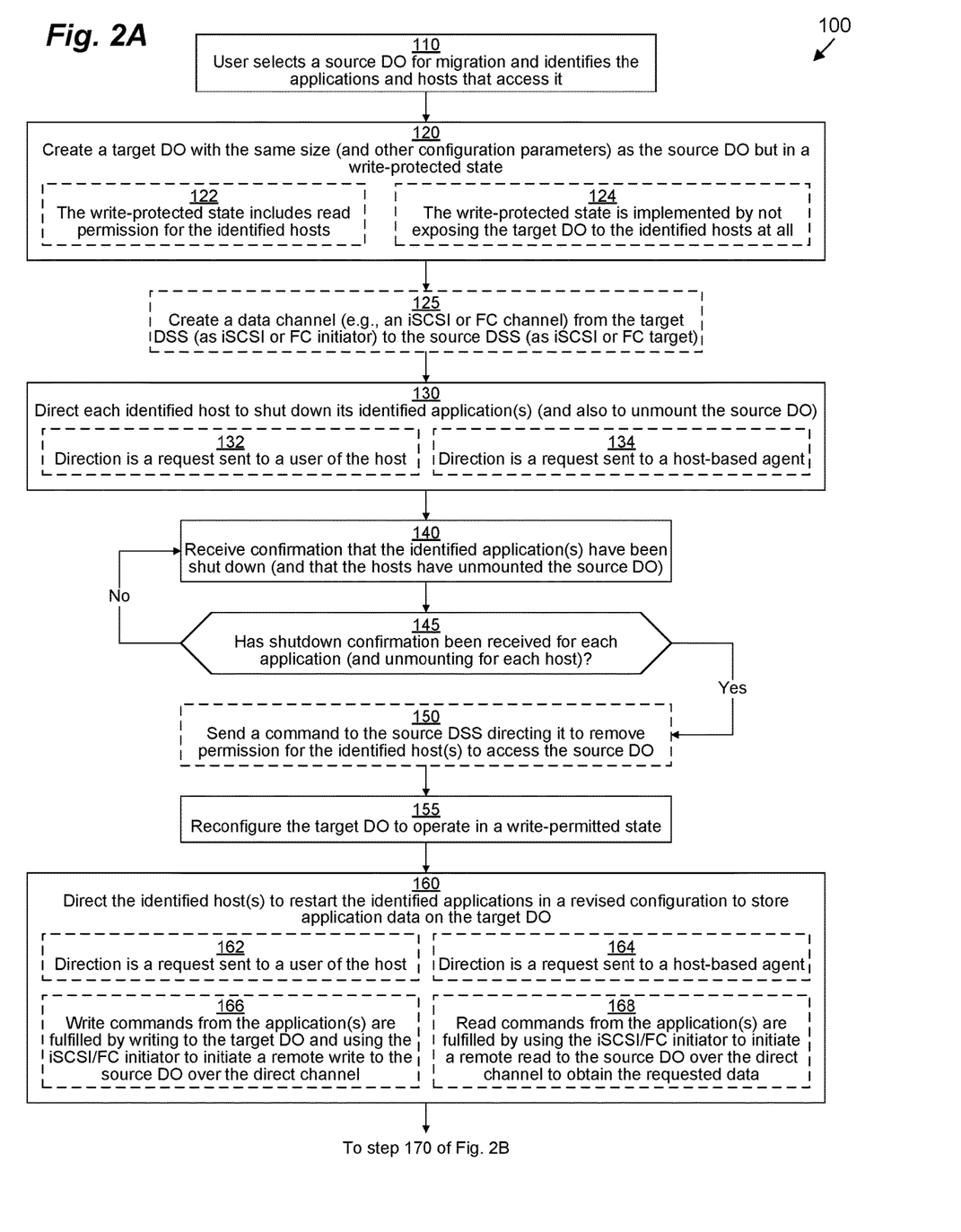
FIGS. 2A-2B are a flowchart depicting an example method according to various embodiments.
Figure 2B:
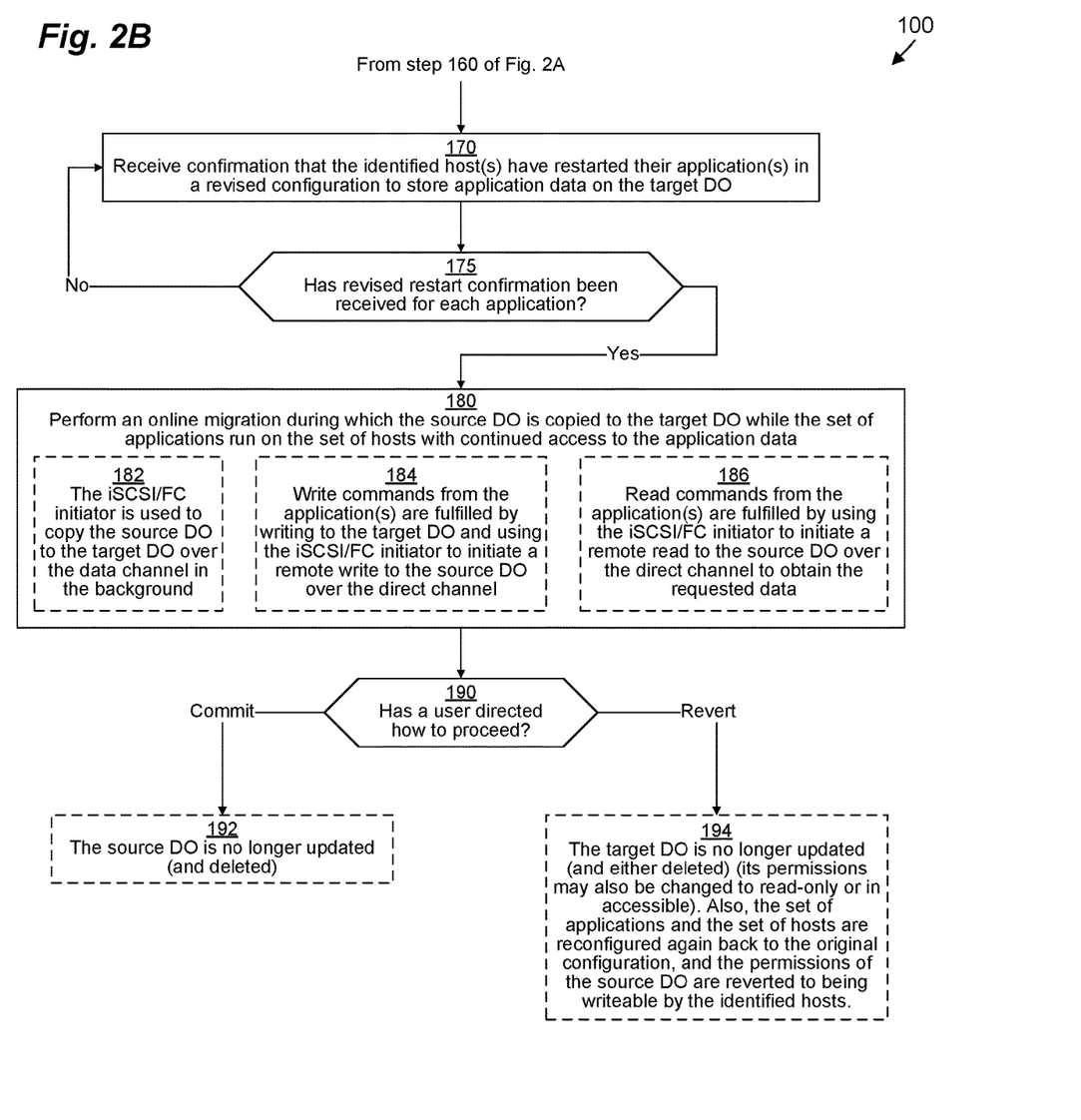

FIGS. 2A-2B illustrate an example method 100 performed by Target DSS computing device 32 for migrating a source DO 46(S) hosted on a remote source DSS computing device 60 to a target DO 46(T) hosted by the target DSS computing device 32 such that a set of applications 52 running on a set of host devices 50 that are initially configured to store application data on the source DO 46(S) become reconfigured to store application data on the target DO 46(T). It should be understood that any time a piece of software (e.g., I/O stack 61, iSCSI/FC initiator 70, migration orchestrator 62, UI 64, iSCSI/FC target 72, application 52, host-based agent 77, OS, etc.) is described as performing a method, process, step, or function, in actuality what is meant is that a computing device (e.g., Target DSS computing device 32, source DSS computing device 60, host device 50, etc.) on which that piece of software is running performs the method, process, step, or function when executing that piece of software on its processing circuitry (e.g., processing circuitry 36 of Target DSS computing device 32). It should be understood that one or more of the steps or sub-steps of method 100 may be omitted in some embodiments. Similarly, in some embodiments, one or more steps or sub-steps may be combined together or performed in a different order. Steps 125, 150, 192, 194, and sub-steps 122, 124, 132, 134, 162, 164, 166, 168, 182, 184, 186 of method 100 marked with dashed lines may be deemed to be either optional or representative of alternative embodiments. Method 100 is performed by target DSS computing device 32.

In step 110, the administrator 68 operates the UI devices 66 to manipulate the UI 64 to select a particular DO 46 (e.g., source DO 46(S)) as a source for migration and to identify the application(s) 52 that access it as well as the host device(s) 50 that that application 52A or applications 52 runs or run on. For example, administrator 68 may search for local DSSes on the network 35, finding source DSS computing device 60, which the administrator 68 may then select. Administrator 68 may then search for DOs 46 hosted by the source DSS computing device 60, and he may then select source DO 46(S) for migration. The administrator 68 may also identify which application 52A or applications 52 running on which host device 50A or devices 50 makes use of the selected source DO 46(S). At that point, the administrator 68 may initiate the migration process to be orchestrated by migration orchestrator 62.

In step 120, the migration orchestrator 62 determines the size of the source DO 46(S), and then it creates target DO 46(T) having the same size. The migration orchestrator 62 also ensures that the permissions 48(T) indicate that at least the host device(s) 50 identified as making use of the source DO 46(S) are not able to access the target DO 46(T) for writing (i.e., the target DO 46(T) is "write-protected" with respect to the identified host devices 50). For example, in some embodiments (sub-step 122), migration orchestrator 62 may make the target DO 46(T) read-only, while in other embodiments (sub-step 124), it may not even allow read access to the identified host device(s) 50 at all. In some embodiments, permissions 48(T) implement write-protection (and possibly also read-protection) with respect to all host devices 50 on the network 35 as well as to all DSS computing devices 32, 60 on the network 35. One benefit to making the target DO 46(T) read-only (at least with respect to the identified host devices 50) rather than both read- and write-protected is that since the host devices 50 already have access to information about the target DO 46(T), they may begin taking steps to access it, which may minimize the total amount of downtime needed during which the application(s) 52 is shut down and not able to access the application data. This step may involve the migration orchestrator 62 sending a create command to the I/O stack 61, which is then able to perform the low-level operations to actually cause the target DO 46(T) to be created in persistent storage 44 with the appropriate size and permissions 48(T).

Then, in step 125, in some embodiments, migration orchestrator 62 creates a data channel (e.g., iSCSI/FC channel 74) from the source DSS computing device 32 as initiator to the target DSS computing device 60 as target. Thus, in some embodiments, iSCSI/FC initiator 70 is placed within I/O stack 61. It should be understood that various protocols may be used for this data channel. One such protocol is the iSCSI protocol, used to transfer SCSI commands across an Internet Protocol (IP) and Ethernet based network, such as network 35. Another such protocol is FC. In some embodiments, the FC protocol is used across an FC-based network; in these embodiments, either network 35 is FC-based (e.g., a SAN) or a second FC-based network is used to connect the DSS computing devices 32, 60. In other embodiments, the FC protocol is used across an IP network; in these embodiments, a protocol such as Internet FC Protocol (iFCP), FC over Ethernet (FCoE), or FC over IP (FCIP) may be used.

Then, in step 130, for every application 52 (e.g., application 52A) identified as making use of the source DO 46(S) (see above at step 110), migration orchestrator 62 sends a command 78 directing that that application 52A be shut down (and, in some embodiments, also directing that the source DO 46(S) be unmounted from its host device 50A). In some embodiments, step 130 is performed via sub-step 132, while in other embodiments, step 130 is performed via sub-step 134. In sub-step 132, the direction is a request sent to a user 76 who is able to control that application 52A. In sub-step 134, the direction is a request sent to a host-based agent 77A configured to control that application 52A running on host device 50A.

Then, in step 140, once the user 76 or host-based agent 77A has shut down an application 52A (and removed the mount point /D1), migration orchestrator 62 receives a confirmation signal 80 from the user 76 or host-based agent 77A confirming that the application 52A has been shut down.

In some embodiments, once the user 76 or host-based agent 77A has unmounted the source DO 46(S) on each host device 50, that host device 50 also returns a confirmation that that host device 50 has unmounted the source DO 46(S).

In step 145, migration orchestrator 62 determines whether or not a confirmation signal 80 has been received back on behalf of every identified application 52 as having been shut down (and on behalf of every host device 50 as having unmounted the source DO 46(S)). If step 145 has an affirmative result, operation proceeds with step 150 (or step 155, if step 150 is skipped). Otherwise, operation returns back to step 140 as additional confirmation signals 80 are received.

In some embodiments, in step 150, migration orchestrator 62 sends a command to source DSS computing device 60 instructing that the permissions 48(S) of the source DO 46(S) be reconfigured so that the identified host devices 50 no longer have access (neither read nor write access) to the source DO 46(S). In some embodiments, step 150 may be performed by sending a command down the I/O stack 61 directed at the permissions 48(S), which may be fulfilled by sending an iSCSI or FC command over iSCSI/FC channel 74.

In step 155, migration orchestrator 62 reconfigures the permissions 48(T) of the target DO 46(T) to allow write access by the identified host devices 50. Step 155 may also include migration orchestrator 62 setting up a mirroring relationship for source DO 46(S) and target DO 46(T) such that all reads directed at target DO 46(T) are fulfilled with reference to the source DO 46(S) and all writes directed at target DO 46(T) are fulfilled with reference to both the target DO 46(T) and the source DO 46(S).

In step 160, migration orchestrator 62 sends a follow-up command (not depicted), directing either the user 76 or host-based agent 77A to restart the application 52A with a revised configuration to make use of the target DO 46(T) for its application data rather than the source DO 46(S) (i.e., the application 52A sends I/O commands 84 to the target DSS computing device 32 rather than to the source DSS computing device 60). In some embodiments, step 160 is performed via sub-step 162, while in other embodiments, step 160 is performed via sub-step 164. In sub-step 162, the direction is a request sent to a user 76 who is able to control that application 52A. In sub-step 164, the direction is a request sent to a host-based agent 77A configured to control that application 52A running on host device 50A.

In some embodiments, once an application 52A is restarted in the revised configuration, it is able to send I/O commands 84 (including read commands 84(R) and write commands 84(W)) to I/O stack 61 in order to read and write application data to/from the target DO 46(T).

A write command 84(W) is processed, in sub-step 166, in two ways in parallel (or concurrently). I/O stack 61 issues the write to the appropriate address of the target DO 46(T) on local persistent storage 44. In addition, the iSCSI/FC initiator 70 forwards it as an iSCSI or FC write command 86(W) over the iSCSI/FC channel 74 to the iSCSI/FC target 72, which causes the data to be written to the appropriate address of the source DO 46(S). A write confirmation (not depicted) may be returned to the iSCSI/FC initiator 70 and then back to the application 52A. Although described as "forwarding," it should be understood that the write command 86(W) may differ significantly from the received write command 84(W). For example, in some embodiments, the received write command 84(W) is a file-based write command (e.g., in NFS or SMB format) addressed to a file of a filesystem, while the write command 86(W) is a block-based command (e.g., in FC or SCSI format) addressed to blocks of storage that underlie the file or filesystem. In other embodiments, both the received write command 84(W) and the write command 86(W) are block-based, but they may be addressed to different devices and different address ranges due to translation of a logical device at one abstraction layer to a physical device at a lower abstraction layer.

A read command 84(R) is processed, in sub-step 168, by having the iSCSI/FC initiator 70 forward it as an iSCSI or FC read command 86(R) over the iSCSI/FC channel 74 to the iSCSI/FC target 72, which causes the appropriate data to be read from the source DO 46(S) and returned over the iSCSI/FC channel 74 as part of an iSCSI or FC read response 88(R) back to the iSCSI/FC initiator 70. The read data is then passed up the I/O stack 61 so that a read response 90(R) can be returned to the application 52A. Although described as "forwarding," it should be understood that the read command 86(R) may differ significantly from the received write command 84(R), as described above in connection with write commands 84(W), 86(W). Similarly, the read response 88(R) may differ significantly from the read response 90(R).

Then, in step 170, once the user 76 or host-based agent 77A has restarted an application 52A in the revised configuration to now make use of the target DO 46(T) for its application data rather than the source DO 46(S), migration orchestrator 62 receives a confirmation signal from the user 76 or host-based agent 77A confirming that the application 52A was restarted in the revised configuration. In some embodiments, step 170 is performed by receiving a dedicated confirmation signal, while in other embodiments, simply receiving an I/O command 84 from an application 52 serves to confirm that it has been restarted in the revised configuration.

In step 175, migration orchestrator 62 determines whether or not a confirmation signal has been received back on behalf of every identified application 52 as having been restarted in the revised configuration. If step 175 has an affirmative result, operation proceeds with step 180. Otherwise, operation returns back to step 170 as additional confirmation signals 80 are received.

In step 180, once it is confirmed that each identified application 52 that previously made use of the source DO 46(S) has been restarted in the new configuration to now make use of the target DO 46(T) for its application data rather than the source DO 46(S), migration orchestrator 62 performs an online migration during which the source DO 46(S) is copied to the target DO 46(T) while the set of applications 52 run on the set of host devices 50 with continued access to the application data. In some embodiments, step 180 may be performed according to well-known techniques.

In some embodiments, step 180 is performed by performing sub-steps 182, 184, and 186 in parallel or concurrently. In sub-step 182, the iSCSI/FC initiator 70 is used to copy the source DO 46(S) to the target DO 46(T) over the iSCSI/FC channel 74 in the background. This may be accomplished by sending copy command 81 from the iSCSI/FC initiator 70 to the iSCSI/FC target 72, resulting in copy operations 82 flowing over the iSCSI/FC channel 74 from the source DSS computing device 60 to the target DSS computing device 32 to fulfill the background copy.

As mentioned above, read and write commands 84(R), 84(W) may be sent and processed in parallel or concurrently with the background copy. As is known in the art, precautions are taken to ensure that the commands 84 and the background copy do not conflict.

In sub-step 184 (similar to sub-step 166), a write command 84(W) is fulfilled, in two ways in parallel or concurrently. I/O stack 61 issues the write to the appropriate address of the target DO 46(T) on local persistent storage 44. In addition, the iSCSI/FC initiator 70 forwards it as an iSCSI or FC write command 86(W) over the iSCSI/FC channel 74 to the iSCSI/FC target 72, which causes the data to be written to the appropriate address of the source DO 46(S). A write confirmation (not depicted) may be returned to the iSCSI/FC initiator 70 and then back to the application 52A.

In sub-step 186 (similar to sub-step 168), a read command 84(R) is fulfilled by having the iSCSI/FC initiator 70 forward it as an iSCSI or FC read command 86(R) over the iSCSI/FC channel 74 to the iSCSI/FC target 72, which causes the appropriate data to be read from the source DO 46(S) and returned over the iSCSI/FC channel 74 as part of an iSCSI or FC read response 88(R) back to the iSCSI/FC initiator 70. The read data is then passed up the I/O stack 61 so that a read response 90(R) can be returned to the application 52A. In some embodiments, if a read command 84(R) is directed at a portion of the application data that has already been either copied from the source DO 46(S) as part of the background copy or written to by a previous write command 84(W), then the read command 84(R) may instead be fulfilled by reading that portion from the target DO 46(T).

Once the background copy terminates, I/O commands may continue to be processed as in steps 166, 168 until the administrator 68 (e.g., using UI devices 66 and UI 64), in step 190, directs how to proceed. If the administrator 68 directs that the migration be committed, then operation proceeds with step 192, in which the migration orchestrator 62 reconfigures the I/O stack 61 such that source DO 46(S) ceases to be updated. This may include deleting the iSCSI/FC initiator 70 and removing the mirroring relationship set up in step 155. Subsequently, read commands 84(R) from applications 52 are processed by I/O stack 61 reading from the target DO 46(T) and not from source DO 46(S), and write commands 84(W) from applications 52 are processed by I/O stack 61 writing to the target DO 46(T) and not to source DO 46(S).

If the administrator 68 directs that the migration be reverted, then operation proceeds with step 194, in which the migration orchestrator 62 reconfigures the environment 30 in a manner similar to how it was originally configured before operation of method 100. Thus, after the set of applications 52 is temporarily taken offline, the identified hosts 50 are reconfigured to remount the source DO 46(S) and to unmount the target DO 46(T), and the identified applications 50 are reconfigured to access the application data by issuing I/O commands 84 to the source DO 46(S) rather than to the target DO 46(T), after which the set of applications 52 is restarted. In addition, the iSCSI/FC initiator 70 and/or the target DO 46(T) may be deleted. In some embodiments, instead of deleting the target DO 46(T), its permissions 48(T) may be changed to disallow access by the hosts 50.

Thus, techniques have been presented for implementing non-host-based migration in a manner that is not subject to certain types of data corruption. This may be accomplished by preventing any hosts 50 from having write access to a target LUN 46(T) (see steps 120, 155) until it can be confirmed that all applications 52 that access a source LUN 46(S) have been shut down (see steps 140, 145). This arrangement prevents accidentally writing to the target LUN 46(T) while the source LUN 46(S) is still being accessed. As a further precaution, just in case the confirmations 80 are incorrect, a target data storage system 32 can direct a source data storage system 60 to remove access to the source LUN 46(S) from all of the hosts 50 (see step 150), which has a similar effect. The migration can then proceed (see steps 160-180).

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by a target data storage system (DSS) of migrating a source data object (DO) hosted on a remote DSS to a target DO hosted by the target DSS such that a set of applications running on a set of host devices that are initially configured to store application data on the source DO become reconfigured to store application data on the target DO, the method comprising:

initially providing the target DO in a write-protected state, the write-protected state preventing the set of host devices from writing to the target DO;

after receiving confirmation that each application of the set of applications has been shut down, reconfiguring the target DO to operate in a write-permitted state, the write-permitted state permitting the set of host devices to write to the target DO;

after reconfiguring the target DO to operate in the write-permitted state, receiving confirmation that the set of applications have been restarted in a revised configuration to store application data on the target DO; and after receiving confirmation that the set of applications have been restarted in the revised configuration, performing an online migration during which the source DO is copied to the target DO while the set of applications run on the set of host devices with continued access to the application data.

2. The method of claim 1 wherein the method further comprises:

after receiving confirmation that each of the set of applications has been shut down, directing the source DSS to make the source DO inaccessible to the set of host devices; and after directing the source DSS to make the source DO inaccessible to the set of host devices, directing the set of host devices to restart the set of applications in the revised configuration.

3. The method of claim 1 wherein reconfiguring the target DO to operate in the write-permitted state is performed after receiving confirmation that each of the set of host devices has unmounted the source DO.

4. The method of claim 1, wherein the method further comprises sending a request to a set of users to shut down the set of applications; and wherein receiving confirmation that each of the set of applications has been shut down includes receiving notifications from the set of users confirming that each of the set of applications has been shut down.

5. The method of claim 1, wherein the method further comprises sending instructions to a host agent running on each of the set of host devices to shut down the set of applications; and wherein receiving confirmation that each of the set of applications has been shut down includes receiving notifications from the host agent running on each of the set of host devices confirming that each of the set of applications has been shut down.

6. The method of claim 1 wherein performing the online migration includes:

receiving a write command from a first application of the set of applications directing that updated application data be written to a particular portion of the application data, and, in response:

writing the updated application data to the particular portion of the application data on the target DO and sending a remote write command to the source DSS directing the source DO to write the updated application data to the particular portion of the application data on the source DO; and receiving a read command from a second application of the set of applications requesting particular application data, and, in response:

sending a remote read command to the source DSS directing the source DO to read the particular application data from the source DO, in response to sending the remote read command, receiving the particular application data from the source DO, and sending the particular application data received from the source DO to the second application in response to the read command.

7. The method of claim 6, wherein the method further comprises establishing a data channel between the target DSS and the source DSS using a remote data storage protocol, the target DSS being configured as a data storage command initiator and the source DSS being configured as a data storage command target;

wherein the source DO is copied to the target DO over the data channel;

wherein sending the remote write command to the source DSS includes sending the remote write command across the data channel for remote fulfillment by the source DSS; and wherein sending the remote read command to the source DSS includes sending the remote read command across the data channel for remote fulfillment by the source DSS.

8. The method of claim 7 wherein the data channel is one of an iSCSI channel and an FC channel.

9. The method of claim 1 wherein the source DSS and the target DSS are different types of DSSes that each operate using different data storage organization techniques.

10. A computer program product comprising a non-transitory computer-readable storage medium storing a set of instructions, which, when performed by a processing circuitry of a target data storage system (DSS) computing device, cause the target DSS computing device to migrate a source data object (DO) hosted on a remote DSS computing device to a target DO hosted by the target DSS such that a set of applications running on a set of host devices that are initially configured to store application data on the source DO become reconfigured to store application data on the target DO by:

initially providing the target DO in a write-protected state, the write-protected state preventing the set of host devices from writing to the target DO;

after receiving confirmation that each application of the set of applications has been shut down, reconfiguring the target DO to operate in a write-permitted state, the write-permitted state permitting the set of host devices to write to the target DO;

after reconfiguring the target DO to operate in the write-permitted state, receiving confirmation that the set of applications have been restarted in a revised configuration to store application data on the target DO; and after receiving confirmation that the set of applications have been restarted in the revised configuration, performing an online migration during which the source DO is copied to the target DO while the set of applications run on the set of host devices with continued access to the application data.

11. The computer program product of claim 10 wherein the set of instructions, when performed by the processing circuitry, further cause the target DSS computing device to:

after receiving confirmation that each of the set of applications has been shut down, direct the remote DSS computing device to make the source DO inaccessible to the set of host devices; and after directing the remote DSS computing device to make the source DO inaccessible to the set of host devices, direct the set of host devices to restart the set of applications in the revised configuration.

12. The computer program product of claim 10 wherein the set of instructions, when performed by the processing circuitry, cause the target DSS computing device to reconfigure the target DO to operate in the write-permitted state after receiving confirmation that each of the set of host devices has unmounted the source DO.

13. The computer program product of claim 10,
wherein the set of instructions, when performed by the processing circuitry, further cause the target DSS computing device to send a request to a set of users to shut down the set of applications; and
wherein receiving confirmation that each of the set of applications has been shut down includes receiving notifications from the set of users confirming that each of the set of applications has been shut down.

14. The computer program product of claim 10,
wherein the set of instructions, when performed by the processing circuitry, further cause the target DSS computing device to send instructions to a host agent running on each of the set of host devices to shut down the set of applications; and
wherein receiving confirmation that each of the set of applications has been shut down includes receiving notifications from the host agent running on each of the set of host devices confirming that each of the set of applications has been shut down.

15. A target data storage apparatus comprising:
a set of persistent storage device that provide persistent storage; and
processing circuitry and memory communicatively-coupled to the persistent storage, the processing circuitry and memory being configured to migrate a source data object (DO) hosted on a remote data storage apparatus to a target DO hosted by the target data storage apparatus such that a set of applications running on a set of host devices that are initially configured to store application data on the source DO become reconfigured to store application data on the target DO by:
initially providing the target DO in a write-protected state, the write-protected state preventing the set of host devices from writing to the target DO;
after receiving confirmation that each application of the set of applications has been shut down, reconfiguring the target DO to operate in a write-permitted state, the write-permitted state permitting the set of host devices to write to the target DO;
after reconfiguring the target DO to operate in the write-permitted state, receiving confirmation that the set of applications have been restarted in a revised configuration to store application data on the target DO; and
after receiving confirmation that the set of applications have been restarted in the revised configuration, performing an online migration during which the source DO is copied to the target DO while the set of applications run on the set of host devices with continued access to the application data.

16. The target data storage apparatus of claim 15 wherein the processing circuitry and memory are further configured to migrate the source DO to the target DO by:
after receiving confirmation that each of the set of applications has been shut down, directing the remote data storage apparatus to make the source DO inaccessible to the set of host devices; and
after directing the remote data storage apparatus to make the source DO inaccessible to the set of host devices, directing the set of host devices to restart the set of applications in the revised configuration.

17. The target data storage apparatus of claim 15 wherein the processing circuitry and memory are configured to reconfigure the target DO to operate in the write-permitted state after receiving confirmation that each of the set of host devices has unmounted the source DO.

18. The target data storage apparatus of claim 15,
wherein the processing circuitry and memory are further configured to migrate the source DO to the target DO by sending a request to a set of users to shut down the set of applications; and
wherein receiving confirmation that each of the set of applications has been shut down includes receiving notifications from the set of users confirming that each of the set of applications has been shut down.

19. The target data storage apparatus of claim 15,
wherein the processing circuitry and memory are further configured to migrate the source DO to the target DO by sending instructions to a host agent running on each of the set of host devices to shut down the set of applications; and
wherein receiving confirmation that each of the set of applications has been shut down includes receiving notifications from the host agent running on each of the set of host devices confirming that each of the set of applications has been shut down.

20. The target data storage apparatus of claim 15 wherein the remote data storage apparatus and the target data storage apparatus are different types of data storage apparatuses that each operate using different data storage organization techniques.

* * * * *